United States Patent [19]

Takaoka et al.

[11] Patent Number: 5,060,618

[45] Date of Patent: Oct. 29, 1991

[54] METHOD AND APPARATUS FOR CONTROLLING TORQUE VARIATIONS IN AN INTERNAL COMBUSTION ENGINE

[75] Inventors: Toshio Takaoka; Keisuke Tsukamoto; Takao Fukuma; Hirofumi Yamasaki, all of Toyota, Japan

[73] Assignee: Toyota Jidosa Kabushiki Kaisha, Toyota, Japan

[21] Appl. No.: 646,668

[22] Filed: Jan. 28, 1991

[30] Foreign Application Priority Data

Jan. 30, 1990 [JP] Japan .................. 2-18011

[51] Int. Cl.⁵ .................. F02D 41/04; F02M 25/07
[52] U.S. Cl. .................. 123/436; 123/571
[58] Field of Search .................. 123/419, 436, 571; 364/431.06, 431.08

[56] References Cited

U.S. PATENT DOCUMENTS

| | | | |
|---|---|---|---|
| 4,557,236 | 12/1985 | Showalter | 123/436 X |
| 4,575,800 | 3/1986 | Kittelson | 123/436 X |
| 4,724,813 | 2/1988 | Cinpinski | 123/436 |
| 4,776,312 | 10/1988 | Yoshioka et al. | 123/436 |
| 5,016,593 | 5/1991 | Takaoka | 123/436 |
| 5,021,960 | 6/1991 | Manaka et al. | 123/436 X |

FOREIGN PATENT DOCUMENTS

| | | | |
|---|---|---|---|
| 0160959 | 11/1985 | European Pat. Off. | 123/436 |
| 58-38354 | 3/1983 | Japan . | |
| 0160530 | 9/1983 | Japan | 123/436 |
| 58-160530 | 9/1983 | Japan . | |
| 0176436 | 10/1983 | Japan | 123/436 |
| 0023037 | 2/1984 | Japan | 123/436 |
| 60-122234 | 6/1985 | Japan . | |
| 61-223243 | 10/1986 | Japan . | |
| 2-153243 | 6/1990 | Japan . | |

Primary Examiner—Willis R. Wolfe
Attorney, Agent, or Firm—Kenyon & Kenyon

[57] ABSTRACT

In an internal combustion engine, a vibration period and a vibration amplitude are measured and the detected vibration period is compared with a natural vibration period prestored in accordance with a driving condition of the vehicle. If the detected vibration period is equal to the natural vibration period under the driving condition at which the vibration period is detected, it is determined that surging due to a torque variation of the engine is occurring. In this condition, the torque variation is controlled to be a predetermined value by increasing an air-fuel ratio or decreasing an amount of EGR when the detected vibration amplitude is smaller than a predetermined value, and the torque variation is controlled to a predetermined value by decreasing an air-fuel ratio or increasing an amount of EGR when the detected vibration amplitude is larger than a predetermined value, and accordingly, the driveability and emission rate are improved.

12 Claims, 11 Drawing Sheets

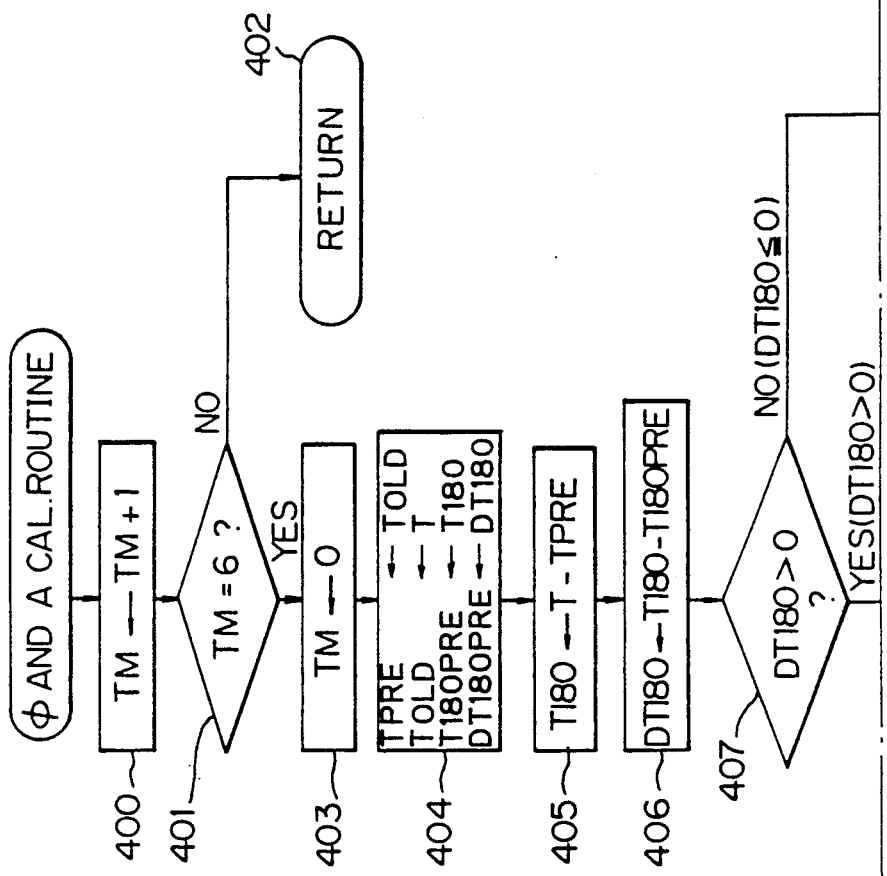

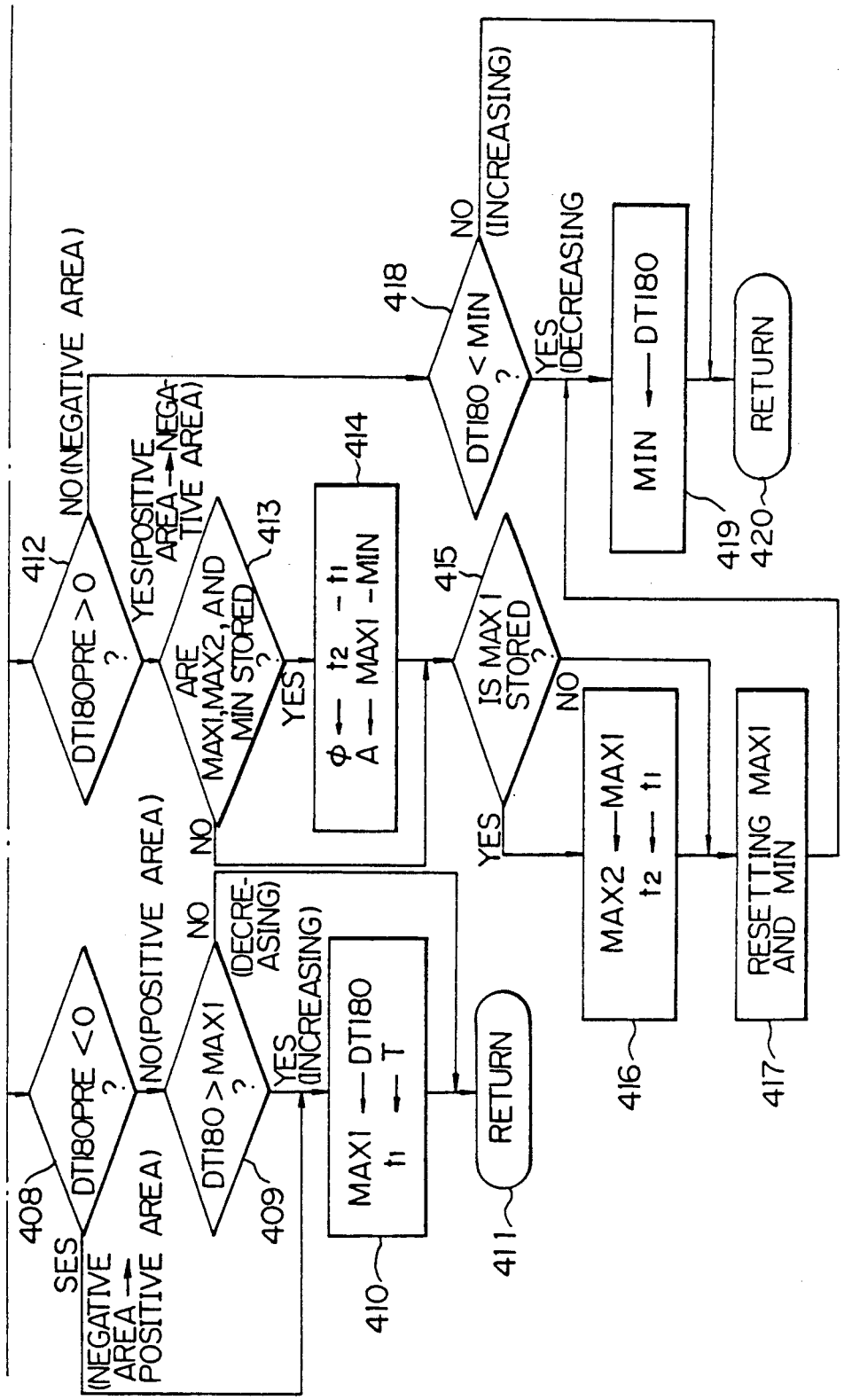

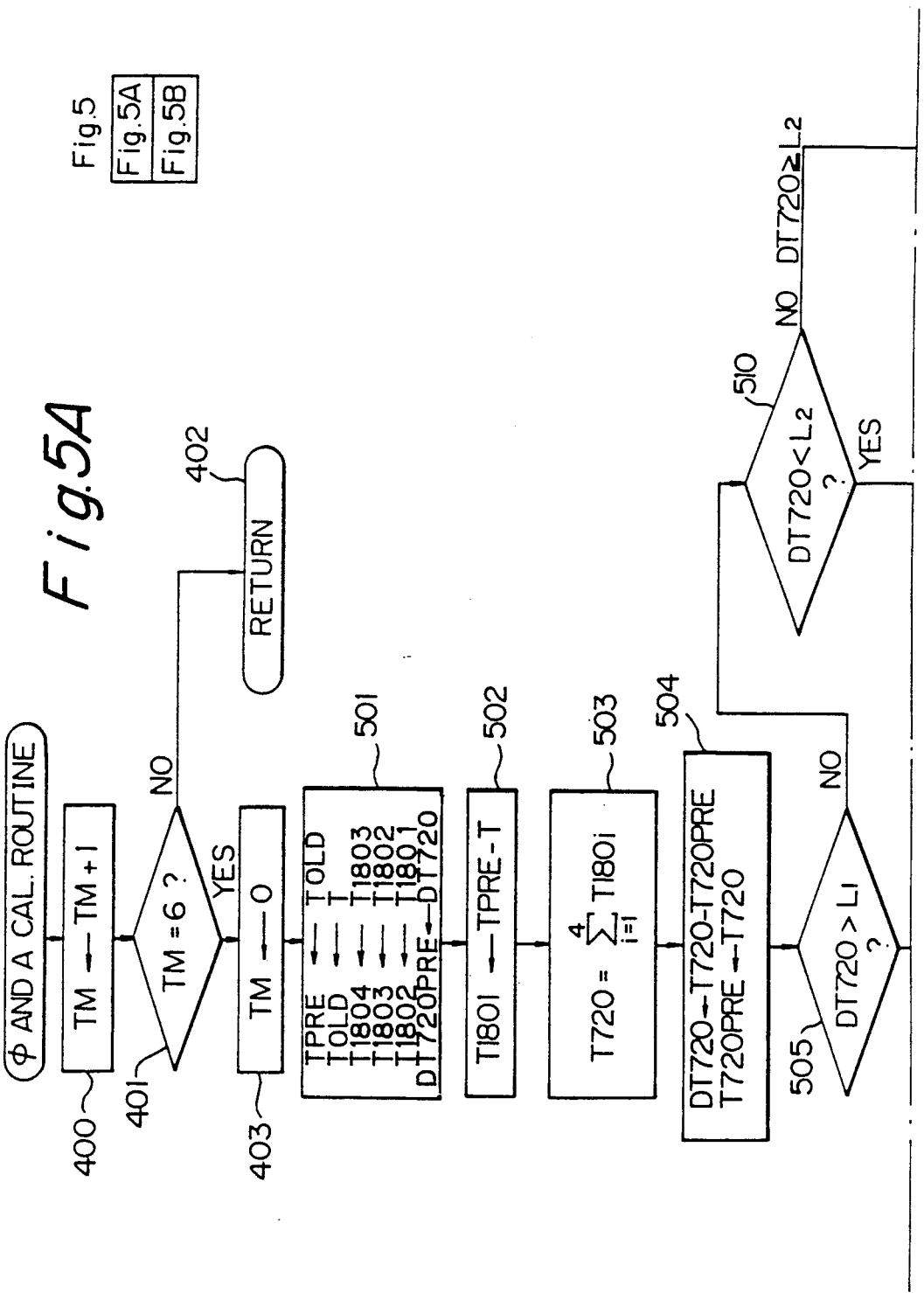

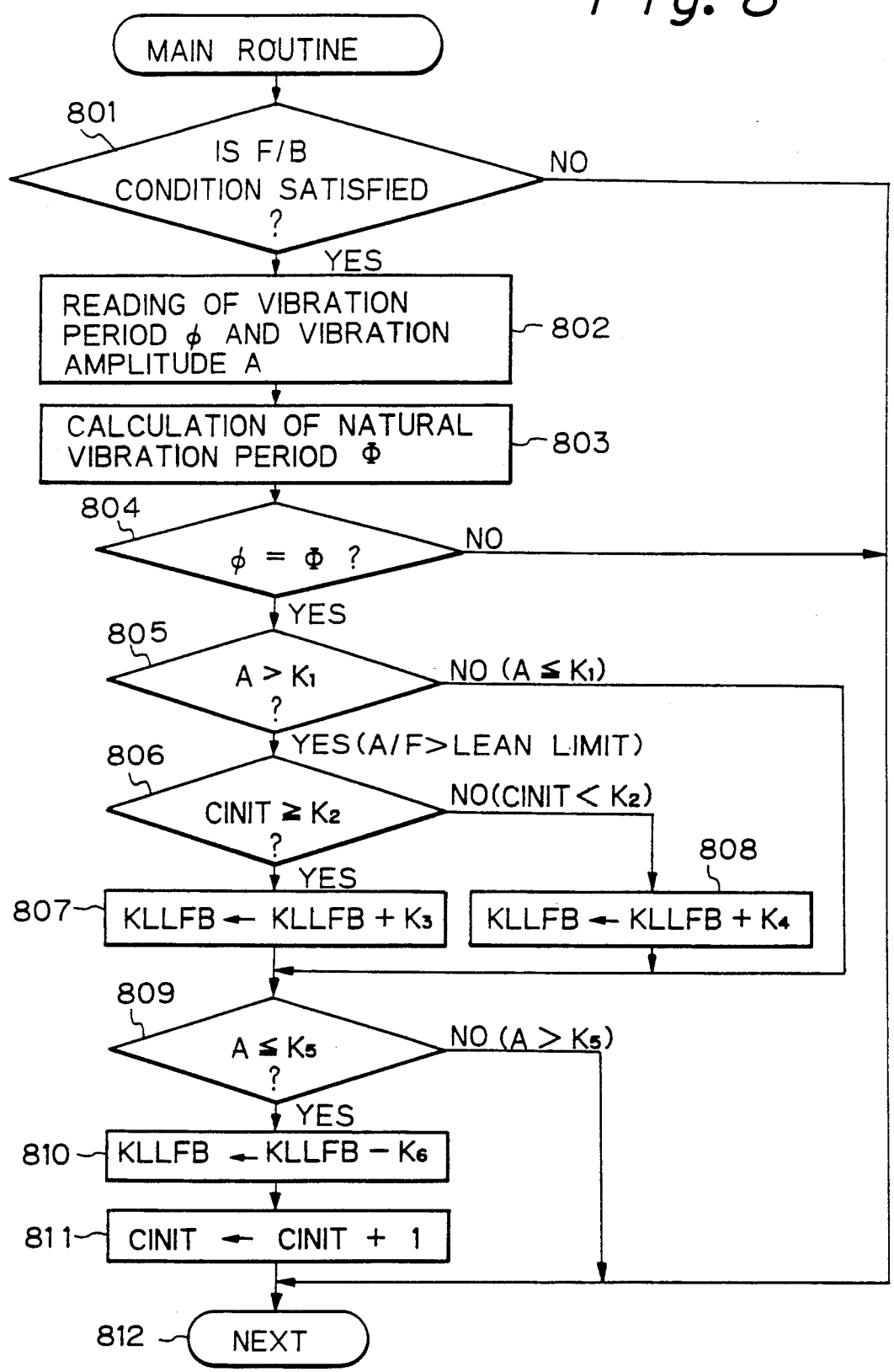

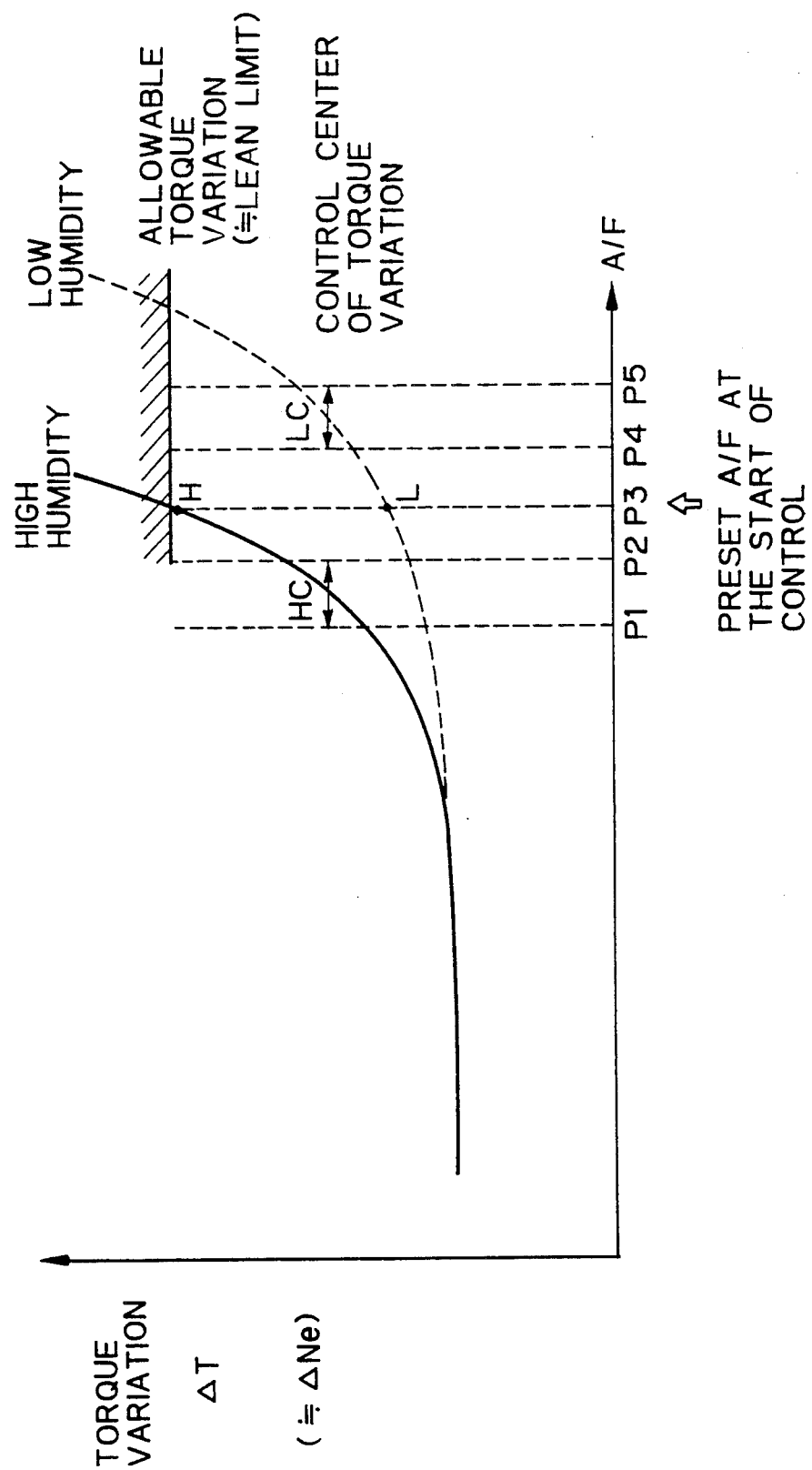

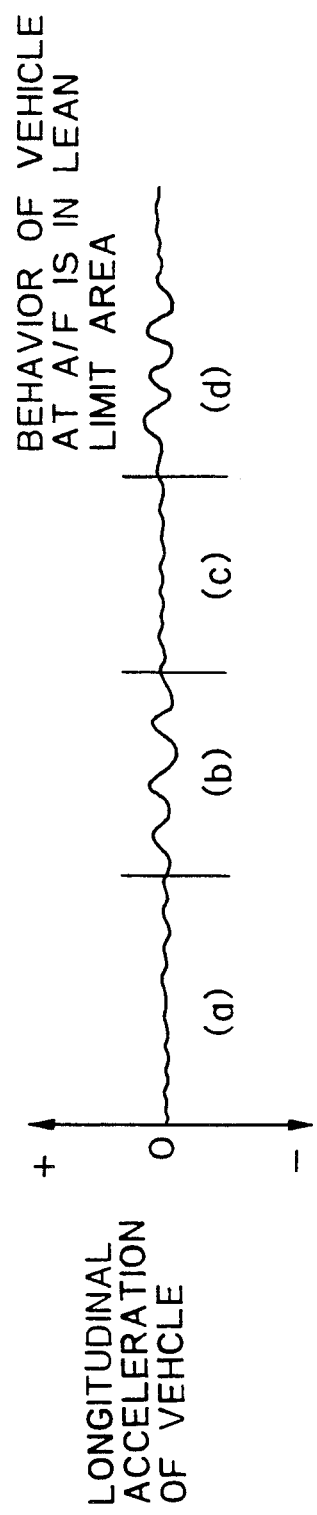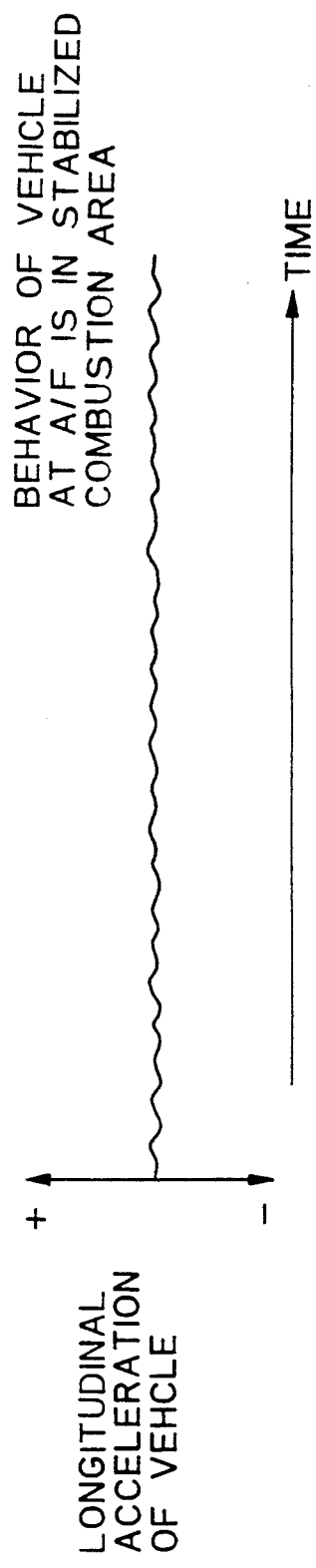

METHOD AND APPARATUS FOR CONTROLLING TORQUE VARIATIONS IN AN INTERNAL COMBUSTION ENGINE

BACKGROUND OF THE INVENTION

1) Field of the invention

The present invention relates to a method and apparatus for controlling torque variations in an internal combustion engine by changing an air-fuel ratio in accordance with the magnitude of the torque variations caused by variations in a cycle-to-cycle combustion in an internal combustion engine, or variations in the speed of the internal combustion engine.

2) Description of the Related Art

Generally, a vehicle having an internal combustion engine is driven by the torque generated by the internal combustion engine, and when the torque is intermittently lost or a negative torque is generated by a misfiring of the internal combustion engine, the vehicle running is adversely affected by such a negative acceleration force. Namely, a repetition of such a negative acceleration force causes a longitudinal vibration of the vehicle, i.e., surging, and passengers in the vehicle suffer discomfort. Therefore, attempts have been made to improve the fuel consumption and emissions by preventing an adverse affect produced by, e.g., surging due to torque variations. To prevent surging, the amount of torque variation of the internal combustion engine is detected and parameters for controlling the internal combustion engine, such as an air-fuel ratio or the amount of EGR (Exhaust Gas Recirculation) are fed back as predetermined set values.

For example, Unexamined Patent Publication (Kokai) No. 60-122234 discloses a lean burn system of the internal combustion engine wherein a feedback control is adopted. In this lean burn system, the amount of variation of the combustion pressure is detected as the amount of torque variation of the engine, and an air-fuel ratio is varied by controlling a fuel amount injected to the engine so that the detected amount of the engine torque variation becomes smaller than a fixed value. The air-fuel ratio obtained by providing the controlled fuel amount is called a lean limit.

The controlled fuel amount is continuously renewed as a learning value in each engine load area defined by both an intake air amount per one rotation of the engine and an engine rotational speed.

Nevertheless, when the engine is restarted after stopping, the air-fuel ratio may exceed the lean limit, because the learned fuel amount is no longer appropriate due to changes of circumstances, such as ambient temperature and moisture, and thus a surging of the engine occurs until the learning value is renewed and becomes an appropriate value. This situation sometimes occurs when the engine is stopped with the learning value that had been renewed and memorized under a low humidity condition and is restarted under a high humidity condition.

To solve the above problem, Japanese Patent Application No. 63-306124 discloses a lean burn system for an internal combustion engine which prevents a surging of the engine due to a change of the lean limit of an air-fuel ratio caused by a change of circumstances In this improved lean burn system, the air-fuel ratio is controlled to the rich side by reducing a predetermined value at the beginning of the variation limit control of the torque of the engine, after the start of the engine.

Nevertheless, even in such an improved lean burn system as described above, the following problems still exist:

(a) the fuel consumption and emissions of the engine are worsened at the beginning of the variation limit control of the torque of the engine after the start of the engine, because an excess margin for the limit of the variation of the torque is set after the control of the air-fuel ratio to the rich side, which is carried out regardless of the torque variations in the engine at that time; and (b) the fuel consumption and emissions of the engine are worsened when the variation limit control of the torque of the engine is started under the condition of a low humidity while a reference air-fuel ratio at the beginning of the variation limit control of the torque of the engine is set to a variation limit control value of the torque under a condition of a high humidity, because an excess margin for the limit of the variation in the torque is similar to that of the above-described case.

SUMMARY OF THE INVENTION

An object of the present invention is to provide a method and apparatus for controlling torque variations in an internal combustion engine in which a poor fuel consumption or high emission rate due to an incorrect control of the engine control parameters can be prevented by detecting variations in a cycle-to-cycle combustion in an internal combustion engine or variations of the speed of the internal combustion engine at the beginning of the variation limit control of the torque after the start of the engine.

According to an aspect of the present invention, an amount of the variations of the torque of the engine is detected when the feedback control conditions of the air-fuel ratio are all satisfied, and the present air-fuel ratio is changed to the lean side by increasing an air-fuel ratio to a predetermined value when the variations in the torque of the engine are small, and the number of changes from the starting of the engine is counted at the same time. Conversely, the present air-fuel ratio is changed to the rich side value by lowering an air-fuel ratio having a predetermined value when the variations in the torque of the engine are large, although the predetermined reducing value for the rich side of the air-fuel ratio is determined in accordance with the number of changes previously carried out for controlling the air-fuel ratio to the lean side. As a result, the fuel consumption and emission rate of the engine are improved, since the amount of change of the air-fuel ratio to the rich side is large under the condition wherein surging of the engine easily occurs, but the amount of change of the air-fuel ratio to the rich side is small under the condition wherein surging of the engine does not easily occur.

BRIEF DESCRIPTION OF THE DRAWINGS

The present invention will be more clearly understood from the description set forth below with reference to the accompanying drawings, wherein:

FIGS. 4, 4A, 4B, 5, 5A, 5B, 6, 7, 8, and 9 are flowcharts showing the operation of the control circuit of FIG. 1;

FIG. 10 is a chart explaining the relationship between an air-fuel ratio and a torque variation which changes in accordance with a high or low humidity condition;

FIG. 11A is a chart showing a behavior of the vehicle when the air-fuel ratio is in a lean limit area;

FIG. 11B is a chart showing a behavior of the vehicle when the air-fuel ratio is in a stabilized combustion area.

DESCRIPTION OF THE PREFERRED EMBODIMENTS

Figure 1:
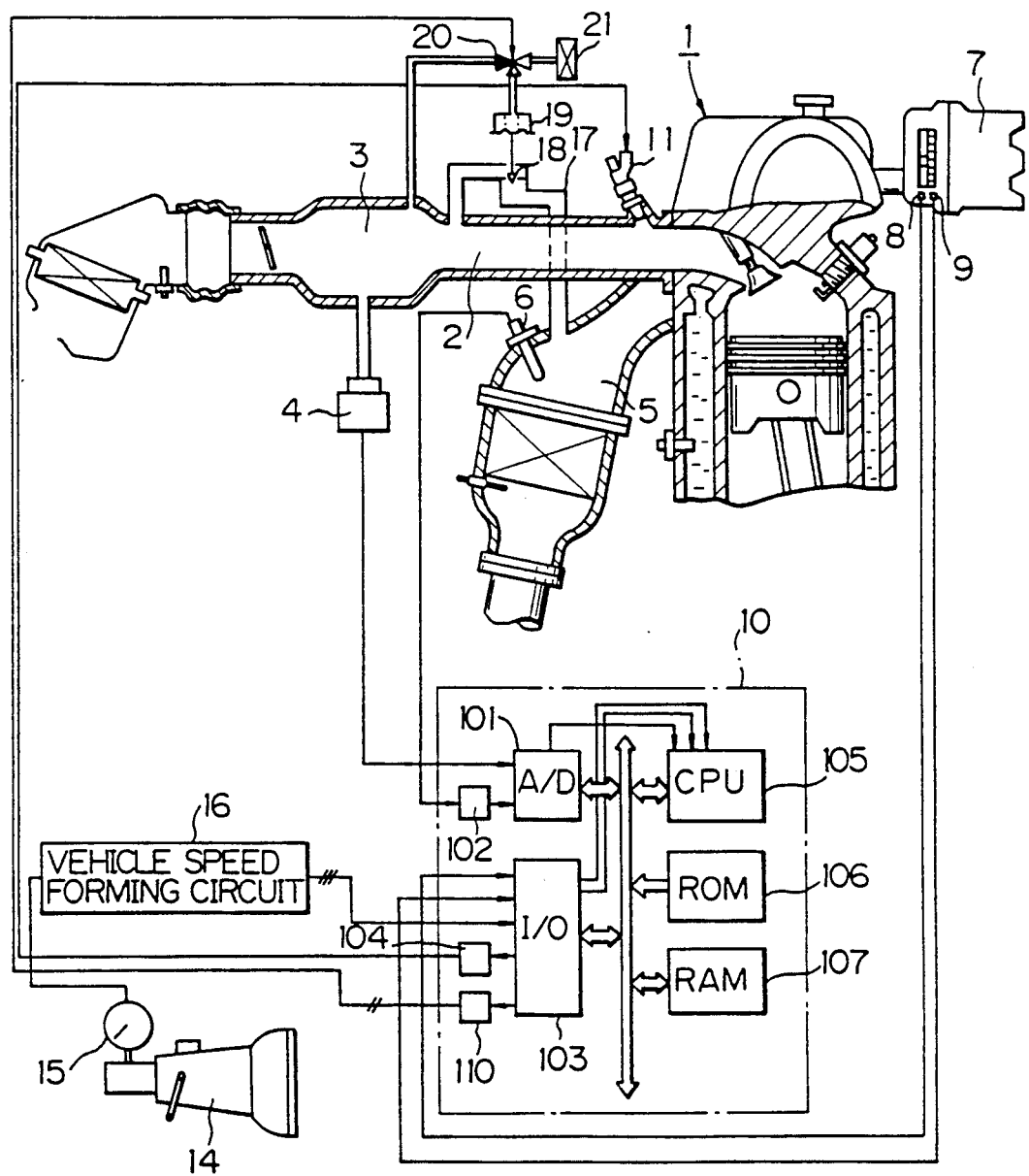
FIG. 1 is a schematic diagram of an internal combustion engine according to the present invention.

In FIG. 1, which illustrates an internal v combustion engine according to the present invention, 1 designates a four-cycle spark ignition engine disposed in an automotive vehicle, and provided in a surge tank 3 of an air-intake passage 2 of the engine 1 is an air-pressure sensor 4 for detecting the absolute pressure of air taken into the engine 1, to thereby generate an analog voltage signal in proportion to the pressure of air flowing therethrough. The signal of the air-pressure sensor 4 is transmitted to a multiplexer-incorporating analog-to-digital (A/D) converter 101 of a control circuit 10.

Provided in an exhaust gas passage 5 of the engine 1 is a lean mixture sensor 6 for detecting the concentration of oxygen in the exhaust gas. The lean mixture sensor 6 generates an output current signal according to an air-fuel ratio and transmits the signal to the A/D converter 101 of the control circuit 10 via a current-voltage conversion circuit 102.

Disposed in a distributor 7 are crank-angle sensors 8 and 9 for detecting the angle of the crankshaft (not shown) of the engine 1. In this case, the crank-angle sensor 8 generates a pulse signal at every 720° crank angle (CA) and the crank-angle sensor 9 generates a pulse signal at every 30° CA. The pulse signals of the crank-angle sensors 8 and 9 are supplied to an input/output (I/0) 103 interface of the control circuit 10. Further, the pulse signal of the crank angle sensor 9 is then supplied to an interruption terminal of a central processing unit (CPU) 105 to be used as a 30° CA interruption signal for calculating a rotational speed Ne of the engine and an amount of fuel injection TAU.

Also provided in the air-intake passage 2 is a fuel injector 11 for supplying pressurized fuel from the fuel system (not shown) to the air-intake port of the cylinder of the engine 1. Note, other fuel injector valves are also provided for other cylinders, although not shown in FIG. 1.

Linking the exhaust gas passage 6 and the intake air passage 2 is an EGR (Exhaust Gas Recirculation) passage 17 having an EGR valve 18 located therein. The EGR valve 18 is linked to a negative pressure actuator 19 which is selectively connected by an electro-magnetic three way valve 20 to a negative pressure port of the surge tank 3 or to an atmosphere filter 21. When the electro-magnetic three way valve 20 is energized by the control circuit 10, ports "black"-"black" are connected and the negative pressure of the surge tank 3 is introduced via the electro-magnetic three way valve 20 into the actuator 19 to open the EGR valve 18. Conversely, when the electromagnetic three way valve 20 is not energized, ports "white"-"white" are connected and atmospheric air is introduced via the filter 21 and the electro-magnetic three way valve 20 into the actuator 19, to close the EGR valve 18. In this case, the electromagnetic three way valve is controlled by the duty ratio of a drive signal generated by a drive circuit 110 of the control circuit 10.

The control circuit 10, which may be constructed by a microcomputer, further comprises a read-only memory (ROM) 106 for storing a main routine, interrupt routines such as a fuel injection routine, an ignition timing routine, tables (maps), and constants, etc., a random access memory 107 (RAM) for storing temporary data, and a drive circuit 104 for driving the injection valve 11 and the like. The drive circuit 104 includes a down counter, a flip-flop and an amplifier circuit, used for controlling the fuel injection amount TAU, whereby an amount of fuel corresponding to the fuel injection amount TAU is injected into the fuel injection valve 11.

Interruptions occur at the CPU 105 when the A/D converter 101 completes an A/D conversion and generates an interrupt signal; when the crank angle sensor 9 generates a pulse signal; and when the clock generator generates a special clock signal.

The intake air pressure data Q of the air-pressure sensor 4 and the output current value of the lean mixture sensor 6 converted into the voltage value RL are fetched by an A/D conversion routine(s) executed at predetermined intervals and then stored in the RAM 107. Namely, the data Q and the value RL in the RAM 107 are renewed at predetermined intervals. The engine speed Ne is calculated by an interrupt routine executed at 30° CA, i.e., at every pulse signal of the crank angle sensor 9, and is stored in the RAM 107.

Attached to a transmission 14 of the engine 1 is a speed sensor 15 for detecting the speed of the vehicle on which the engine 1 is mounted. The speed sensor 15 generates and transmits an output voltage signal to a vehicle speed signal forming circuit 16, and the vehicle speed signal forming circuit 16 forms a signal showing the speed of the vehicle and transmits it to the I/0 103 of the control circuit 10. Further, a signal from a throttle switch (not shown) for detecting an open or closed condition of a throttle valve and a signal from a throttle opening sensor (not shown) for detecting a throttle valve opening rate are input to the control circuit 10.

Before the operation of the control circuit 10 of FIG. 1, which will be explained hereinafter with reference to the flow charts of FIGS. 4, 5, 6, 7, 8, 9, 10, 11, 12, and 14, the relationship between a longitudinal acceleration G of the vehicle and a change of the time difference DT180 is explained with reference to the waveforms of FIGS. 2A and 2B.

Figure 2A:
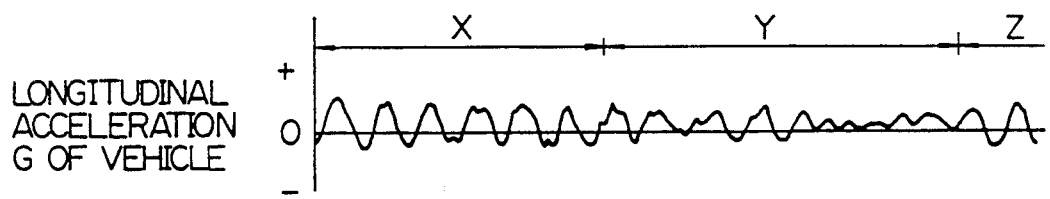
FIG. 2A is a waveform indicating a longitudinal acceleration G of the vehicle.

FIG. 2A shows a model waveform of the longitudinal acceleration G of the vehicle. In this model, the longitudinal acceleration G is large in a period X, becomes smaller in a period Y, and becomes larger again in a period Z. FIG. 2B shows an alternation of the time difference DT180 when the longitudinal acceleration G changes as shown in FIG. 2A. The time required for the crankshaft to rotate by the crank angle of 180° is called a 180 ° CA time, and the time difference DT180 is defined as the differential value obtained by the subtraction of two successively detected 180° CA times. As shown in FIGS. 2A and 2B, the time difference DT180 is large in the period X, becomes smaller in the period Y, and becomes larger again in the period Z, and thus a surging of the vehicle due to variations of the combustion cycle can be detected when the amplitude of the time difference DT180 is large and the period of the time difference DT180 is equal to the natural vibration period of the vehicle.

FIGS. 4A and 4B show a routine for calculating the time difference DT180, and the vibration period $\phi$ and the vibration amplitude A based on the variations of the combustion cycle occurring at every 30° crank angle, by a signal output by the crank angle sensor 9 of the distributor 7.

At step 400, a timing counter TM is incremented by 1, and at step 401, it is determined whether or not the count of the timing counter TM is equal to 6. If the count of the timing counter TM is not equal to 6, this routine is completed at step 402, but if the count of the timing counter TM is equal to 6, the control proceeds to step 403 and the timing counter TM is reset. These steps 400 to 403 determine the calculation timing of the time difference DT180, since the time difference DT180 must be calculated at every 180° CA.

Figure 6:
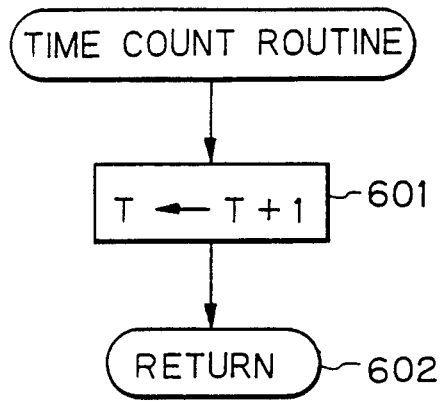

Accordingly, the control proceeds to step 404 at every 180° CA, which is the time required for a piston of a cylinder to move from a top dead center to a bottom dead center, or vice versa, of the stroke thereof. Then, at step 404, a value TOLD which is a value of a time counter T of 30° crank angle before, a time value T180, and the time difference DT180, all recorded at a prior 180° CA time, are stored in the RAM 107 as an old time value TPRE, T180PRE, and DT180PRE, to calculate the time difference DT180 in this routine. Thereafter, the value of the time counter T is read out and stored in the RAM 107 as a present time and an old time value TOLD, and the time value T180 is calculated by $$T180 \leftarrow T - TPRE$$

at step 405. The time counter T counts the time at step 601 of the time count routine shown in FIG. 6. (In practice, the present time value T180 is recorded at ATDC 10° for every cylinder according to the timing of the output signal from the crank-angle sensor 9.) The routine of FIG. 6 is completed by step 602.

Figure 3:
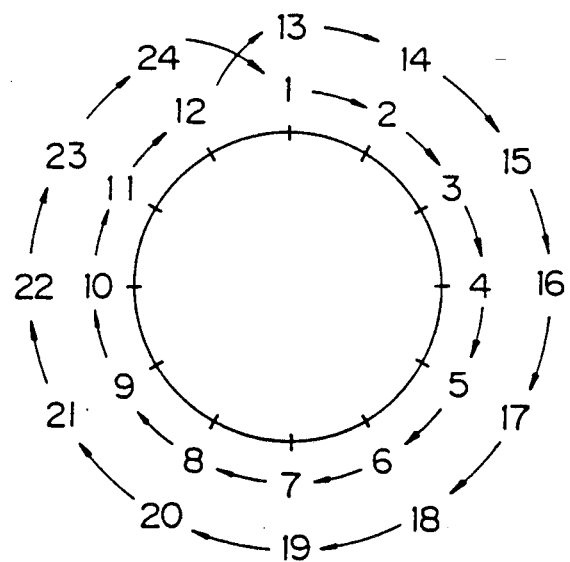
FIG. 3 is a chart explaining 30° crank angles and the signal output positions of a crank angle sensor.

Further, the crankshaft rotates for 720° (720° CA) at one stroke of the piston of the engine, so that the crank-angle sensor 9 generates 24 signals at every 30° CA for one stroke of the piston of the engine, as shown in FIG. 3. Accordingly, the value of the time counter T is recorded at No. 1, 7, 13, and 19 of output signals from the crank-angle sensor 9, to calculate the time value T180. Although the calculation of the time difference DT180 and the time value T180 are explained in the same routine in the present invention, the calculation of the time difference DT180 may be carried out after the calculation of the time value T180. For example, when the calculation of the time value T180 is carried out at the 1st and 7th output signals from the crank-angle sensor 9, the calculation of the time difference DT180 may be carried out at the 2nd and 8th output signals from the crank-angle sensor 9.

After step 405, the control proceeds to step 406, at which the calculation of the time difference DT180 is carried out as follows:

$$DT180 \leftarrow T180 - T180PRE.$$

Then, at step 407, it is determined whether or not the time difference DT180 is larger than 0, and if DT180>0, the control proceeds to step 408. If DT180≦0, the control proceeds to step 412.

At step 408, it is determined whether or not the time difference at the last routine DT180PRE is smaller than 0. If DT180PRE<0, which indicates DT180 when the time difference changes from a negative area to a positive area, the control proceeds to step 410, at which the time difference DT180 is set as the maximum value MAX1 and the value of the counter T is recorded in the RAM 107 as time t1, and the control then proceeds to step 411 to complete the routine. If DT180PRE≧0 at step 408, which indicates that the time difference DT180 is still in a positive area, the control proceeds to step 409 to determine whether or not the time difference DT180 is larger than the maximum value MAX1. If DT180>MAX1, which indicates that the time difference DT180 is increasing, the control proceeds to step 410, but if DT180≦MAX1, which indicates that the time difference DT180 is decreasing, the control proceeds to step 411 to complete the routine.

At step 412, it is determined whether or not DT180PRE is larger than 0. If DT180PRE>0, which indicates that the time difference DT180 has changed from the positive area to the negative area, the control proceeds to step 413, but if DT180PRE≦0, which indicates that the time difference DT180 is still in the negative area, the control proceeds to step 418. At step 413, it is determined whether or not the maximum value MAX1, a maximum value MAX2, and a minimum value MIN are all stored in the RAM 107. If MAX1, MAX2, and MIN are all stored in the RAM 107, the control proceeds to step 414. If at least one of MAX1, MAX2, and MIN is not stored in the RAM 107, the control proceeds to step 415. At step 414, the vibration period $\phi$ and the amplitude of the vibration A are calculated by $$\phi \leftarrow t2 - t1$$

$$A \leftarrow MAX1 - MIN$$

and the control then proceeds to step 415. At step 415, it is determined whether or not the maximum value MAX1 is stored in the RAM 107. If MAX1 is stored in the RAM 107, the control proceeds to step 416 at which the maximum value MAX1 is set as the maximum value MAX2 and the value of the counter t1 is recorded in the RAM 107 as time t2, and then proceeds to step 417. If MAX1 is not stored in the RAM 107, the control proceeds to step 417 and the maximum value MAX1 and the minimum value MIN are reset, and the control then proceeds to step 419. At step 418, it is determined whether or not the time difference DT180 is smaller than the minimum value MIN. If DT180<MIN, which indicates that the time difference DT180 is decreasing, the control proceeds to step 419, but if DT180≧MIN, which indicates that the time difference DT180 is increasing, the control proceeds to step 420 to complete the routine. At step 419, the time value DT180 is set as the minimum value MIN and the control then proceeds to step 420 to complete the routine.

The flowchart of FIGS. 4A and 4B will be explained in more detail with reference to FIG. 2B. When the time difference DT180 is increasing, the point α in FIG. 2B is calculated as the maximum value MAX1, and at the same time, the time T is recorded as the time t1. When a change of the time difference DT180 from a positive area to a negative area is detected, the point α is recorded as the maximum value MAX2, and at the same time, the time t1 is recorded as the time t2. Then the pointβ is calculated as the minimum value MIN, and thereafter, the pointγ is calculated as the maximum value MAX1, and at the same time, the time T is recorded as time t1. In this way, when the datum of the points α, β, and γ are all stored in the RAM 107, the vibration period φ and the amplitude of vibration A are calculated by $$\phi \leftarrow t2 - t1$$

$$A \leftarrow MAX1 - MIN.$$

Note, torque is generated when gas expands in each cylinder in a four cycle combustion engine, and thus the torque is intermittently delivered to the crankshaft. Accordingly, the variation of the crankshaft due to this intermittent torque is often superimposed on the signal from the crank-angle sensor 9, as noise, and when the crank-angle sensor 9 is attached to a distributor connected directly to a camshaft, an impact vibration from the cam is felt by the crank-angle sensor 9 and becomes noise in the output signal therefrom. In such cases, it is difficult to detect an exact vibration periodφ and exact amplitude of the vibration A over the wide range of engine rotation, and thus the time difference DT180 must be calculated by using a average value of the signals from the crank-angle sensor 9 over the whole rotational area of the engine. Further, when the turning point of the time difference DT180 from a positive area to a negative area, or vice versa, is difficult to calculate due to the aforementioned noise, a dead zone should be set near the point at which the difference of the T180° time is equal to 0.

Figure 5B:
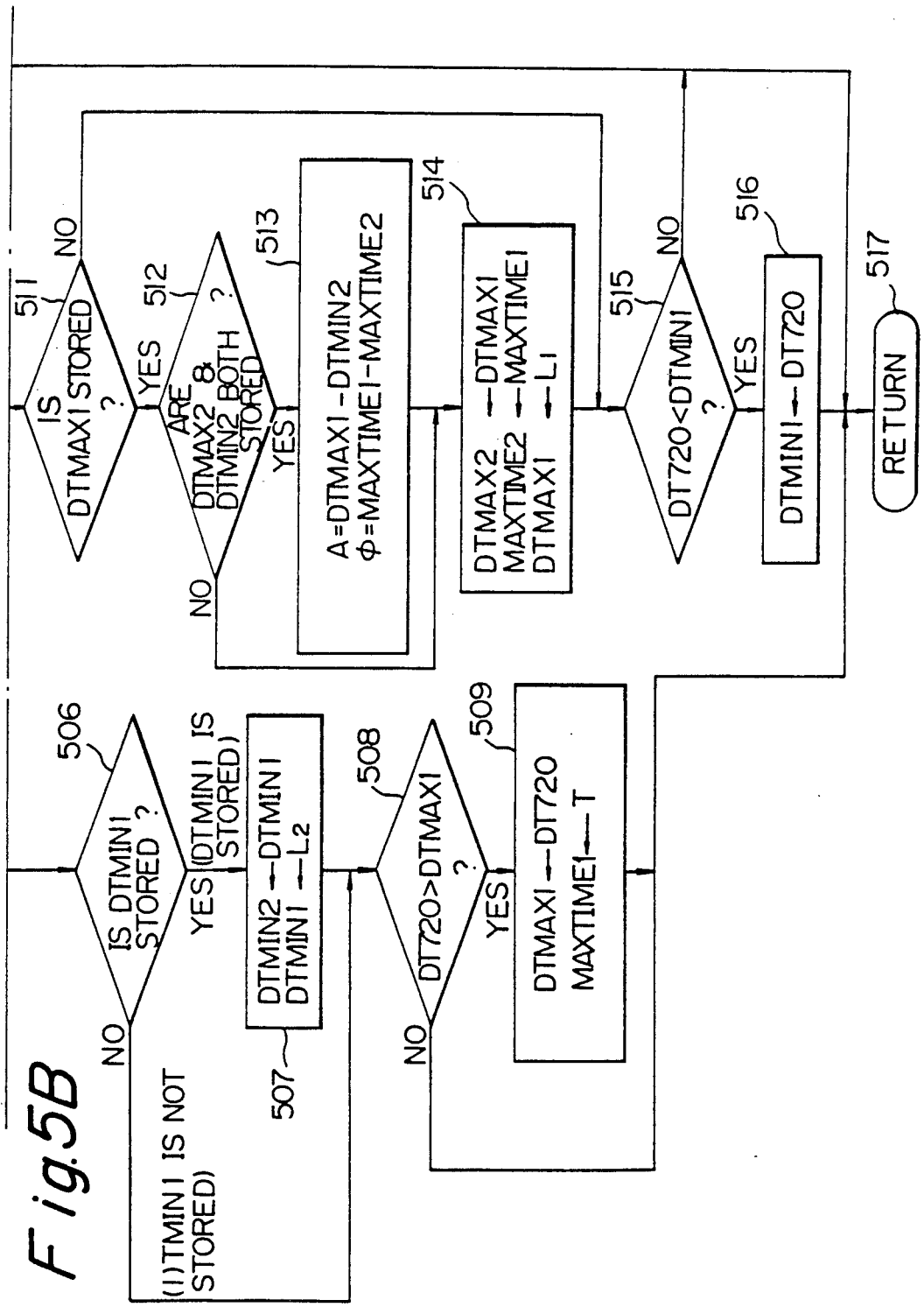

FIGS. 5A and 5B are a routine for calculating the time difference DT720, and the vibration periodφ and the vibration amplitude A using a average value of the signals from the crank-angle sensor 9. This routine is also executed at every 30° crank angle by a signal from the crank angle sensor 9 of the distributor 7.

Steps 400 to 403 in FIG. 5A correspond to the same steps in FIG. 4A, and accordingly, an explanation thereof is omitted. At step 501, a value TOLD which is a value of a time counter T of 30° crank angle before is stored in the RAM 107 as an old time value TPRE; a value of a time counter T is stored in the RAM 107 as a present time value TOLD; a time value T1803, which is the time value T180 recorded 540° CA previously, is stored in the RAM 107 as T1804; a time value T1802, which is the time value T180 recorded 360° CA previously is stored in the RAM 107 as T1803; a time value T1801, which is the time value T180 recorded 180° CA previously is stored in the RAM 107 as T1802; and the time difference DT720 is stored in the RAM 107 as DT720PRE. Then the control proceeds to step 502, at which the value of the time counter T is read out and stored in the RAM 107 as a present time, and the time value T1801 is calculated by $$T1801 \leftarrow T - TPRE.$$

At step 503, a time value T720 which is a sum of four T180 time values in the last three routines and in this routine is calculated by $$T720 \leftarrow T1801 + T1802 + T1803 + T1804$$

and the control then proceeds to step 504, at which the calculation of the time difference DT720 is carried out by $$DT720 \leftarrow T720 - T720PRE.$$

Figure 2B:
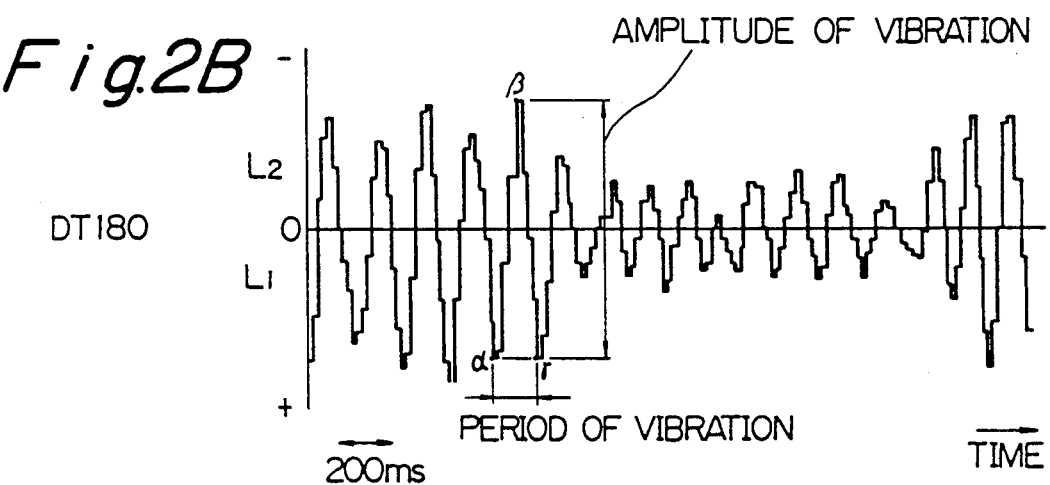
FIG. 2B is a waveform indicating a change of the time difference DT180 in comparison with the longitudinal acceleration G shown in FIG. 2A.

Then at step 505, it is determined whether or not the time difference DT720 is larger than an upper limit $L_1$ of the dead zone (shown in FIG. 2B). If $DT720 > L_1$, the control proceeds to step 506, and if $DT720 \leq L_1$, the control proceeds to step 510.

At step 506, it is determined whether or not a minimum value DTMIN1, except a lower limit L, (shown in FIG. 2B) of the dead zone, is stored in the RAM 107. If the minimum value DTMIN1 is stored in the RAM 107, the control proceeds to step 507, at which the minimum value DTMIN1 is stored in the RAM 107 as a minimum value DTMIN2, and the lower limit $L_2$ of the dead zone is stored in the RAM 107 as the minimum value DTMIN1. If the minimum value DTMIN1 is not stored in the RAM 107, the control proceeds to step 508. At step 508, it is determined whether or not the time difference DT720 is larger than the maximum value DTMAX1. If DT720>DTMAX1, the control proceeds to step 509, at which the time difference DT720 is set as the maximum value DTMAX1 and the value of the counter T is recorded in the RAM as a time MAXTIME1, and the control then proceeds to step 517 to complete the routine. If DT720≦DTMAX1, the control proceeds to step 517 to complete the routine.

At step 510, it is determined whether or not the time difference DT720 is smaller than the lower limit $L_2$ of the dead zone, and if $DT720 < L_2$, the control proceeds to step 511. If $DT720 \geq L_2$, which indicates that the time difference DT720 is still between the lower limit $L_2$ and the upper limit $L_1$, the control proceeds to step 517 to complete the routine. At step 511, it is determined whether or not a maximum value DTMAX1, except the upper limit $L_1$ of the dead zone, is stored in the RAM 107. If the maximum value DTMAX1 is stored in the RAM 107, the control proceeds to step 512, but if the maximum value DTMAX1 is not stored in the RAM 107, the control proceeds to step 515. At step 512, it is determined whether or not a maximum value DTMAX2 and a minimum value DTMIN2 are both stored in the RAM 107. If the maximum value DTMAX2 and the minimum value DTMIN2 are both stored in the RAM 107, the control proceeds to step 513, but if the maximum value DTMAX2 and the minimum value DTMIN2 are not both stored in the RAM 107, the control proceeds to step 514. At step 513, the vibration periodφ and the amplitude of the vibration A are calculated by $$\phi \leftarrow MAXTIME1 - MAXTIME2$$

$$A \leftarrow DTMAX1 - DTMIN2$$

and the control then proceeds to step 514.

At step 514, the maximum value DTMAX1 is stored in the RAM 107 as a maximum value DTMAX2, the time MAXTIME1 is stored in the RAM 107 as the time MAXTIME2, and the lower limit $L_1$ of the dead zone is stored in the RAM 107 as the maximum value DTMAX1, and the control then proceeds to step 515. At step 515, it is determined whether or not the time difference DT720 is smaller than the minimum value DTMIN1, and if DT720<DTMIN1, the control proceeds to step 516, but if DT720≧DTMIN1, the control proceeds to step 517 to complete the routine. At step 516, the time difference DT720 is stored as the minimum value DTMIN1, and then the control proceeds to step 517 to complete the routine.

In this routine, first the time difference DT720 is calculated by adding four sequential DT180 times and then the time difference DT180 is calculated by the differential value of the time difference DT720 and DT720PRE at every 180° CA. Accordingly, in a four cycle engine, the differential value of the time difference DT720 and DT720PRE corresponds to the differential value of an expansion stroke of the same cylinder, and thus variations of the crank-angle at different cylinders due to differences of an air-fuel ratio can be ignored and the exact value of the vibration period $\phi$ can be calculated.

Figure 7:
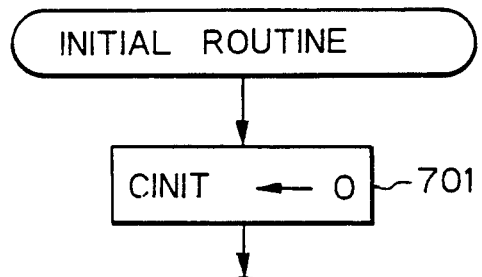

FIG. 7 is an initial routine executed only once each time the ignition switch is made ON. In this routine, a counter CINIT is reset at step 701. This counter CINIT is used for counting a number of times the air-fuel ratio is controlled to the lean side, by the lean limit control explained later.

FIG. 8 is a part of the main control routine of the present invention, and is executed at a predetermined number of rotations of the engine.

At step 801, it is determined whether or not a feedback condition of the air-fuel ratio is satisfied, i.e., it is determined whether or not the lean limit control conditions for the air-fuel ratio are all satisfied. The lean limit control conditions, for example, are as follows:

(1) the engine is not in a startup condition;
(2) the engine is not in post-startup enrichment condition;
(3) the engine is not in a fuel cut condition;
(4) the rotational speed of the engine Ne is less than a predetermined value; and
(5) the temperature of the cooling water THW is greater than a predetermined value.

If the all of the lean limit control conditions are satisfied, the control proceeds to step 802, and if at least one of the lean limit control conditions is not satisfied, the control proceeds to step 812 to continue with the main routine (not shown in FIG. 8).

At step 802, the vibration period $\phi$ and the amplitude of the vibration A calculated in the routine shown in FIG. 4B are read out from the RAM 107, and at step 803, a calculation of a natural vibration period $\Phi$ is carried out in accordance with a driving condition parameter of the engine The natural vibration period $\Phi$ is already calculated in accordance with the driving condition parameter, such as a vehicle speed, a rotation speed of the engine, or a gear position decided by the vehicle speed and the rotational speed of the engine, and stored in the ROM 106, for example in the form of a map. Accordingly, at step 803, the natural vibration period $\Phi$ is calculated from the map by using the gear position and the rotational speed of the engine.

Then, at step 804, it is determined whether or not the vibration period $\phi$ is equal to the natural vibration period $\Phi$, and if $\phi = \Phi$, the control proceeds to step 805. If $\phi \neq \Phi$, the control proceeds to step 812 to continue the main routine.

At step 805, it is determined whether or not the vibration amplitude A is larger than a predetermined value $K_1$, which is a reference value used to determine an occurrence of surging, i.e., to determine whether or not the air-fuel ratio exceeds the lean limit value. If $A \leq K_1$, the control proceeds to step 809 to determine whether or not the air-fuel ratio should be controlled to the lean side, but if $A > K_1$, the control determines that the air-fuel ratio has exceeded the lean limit value and proceeds to step 806.

Before the explanation of steps 806 to 808, an explanation is given of steps 809 to 811, which show the control of the air-fuel ratio to the lean side. At step 809, it is determined whether or not the vibration amplitude A is smaller than or equal to a predetermined value $K_5$, which is smaller than the value $K_1$ as explained in step 805. If $A > K_5$, the control proceeds to step 812 to continue the main routine, but if $A \leq K_5$, the control proceeds to step 810 because it is determined that the air-fuel ratio has been excessively controlled to the rich side. Accordingly, at step 810, a coefficient KLLFB for controlling the amount of fuel injection is decremented by a predetermined value $K_6$ to decrease the amount of fuel injection and change the air-fuel ratio to the lean side. Then at step 811, the counter CINIT for counting a number of changes of the air-fuel ratio to the lean side by the lean limit control is incremented by 1, and the control proceeds to step 812 to continue the main routine.

In this way, the air-fuel ratio is controlled to the lean side and the number of changes is counted to detect the degree of change if the vibration amplitude A is smaller than or equal to a predetermined value $K_5$.

Conversely, at step 806, it is determined whether or not the value of the counter CINIT is larger than or equal to a predetermined value $K_2$, which is a reference value used when determining the degree of change of the air-fuel ratio to the lean side. If CINIT $\geq K_9$, at step 806, the control proceeds to step 807 at which a coefficient KLLFB for controlling the amount of fuel injection is incremented by a predetermined relatively small value $K_3$, to thereby slightly increase the amount of fuel injection whereby the air-fuel ratio is slightly shifted to the rich side. If CINIT<$K_2$ at step 806, however, the control proceeds to step 808 at which a coefficient KLLFB is incremented by a predetermined relatively large value $K_4$ ($>K_2$) because it is determined that the air-fuel ratio is controlled excessively to the lean limit. As a result, the amount of fuel injection is largely increased and that the air-fuel ratio is changed to the rich side.

Figure 9:
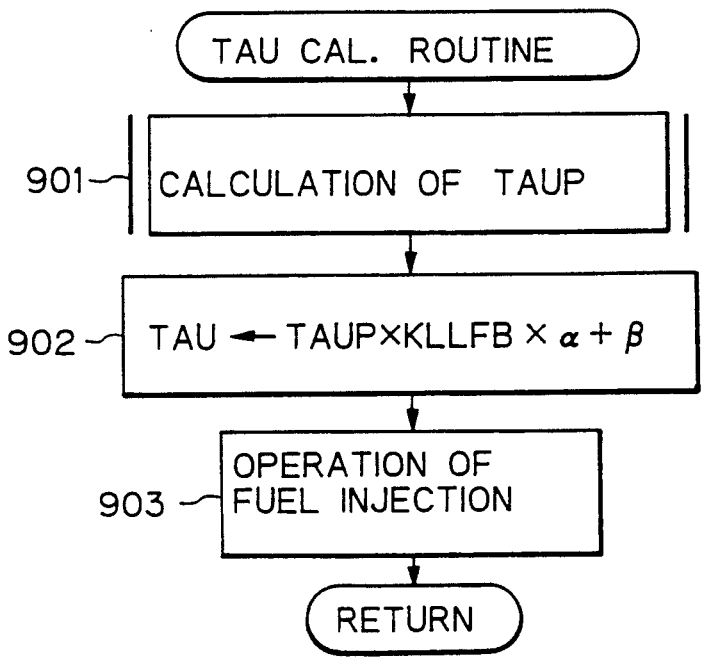

FIG. 9 shows the calculation of the fuel injection amount TAU executed at a predetermined crank-angle, for example, 360° CA, when the engine is a center injection type, and at 180° CA when the engine having four cylinders is a separate injection type. At step 901, the base fuel injection amount TAUP is calculated in accordance with the intake air pressure data PM and engine rotational speed data Ne read out from the RAM 107. And at step 902, the final fuel injection amount TAU is calculated with a correction of the base fuel injection amount TAUP in accordance with the coefficient KLLFB and driving condition parameters $\alpha$ and $\beta$ shown below.

$$TAU \leftarrow TAUP \times KLLFB \times \alpha + \beta$$

Note that the driving condition parameters α and β are determined by a signal from a throttle position sensor, a signal from a temperature sensor for an intake air, a signal from a voltage sensor for a battery, and so on (not shown in FIG. 1) which are also stored in RAM 107.

At step 903, a fuel injection operation is carried out in accordance with the fuel injection amount TAU calculated at step 902. In this operation, for example, the fuel injection amount TAU is preset in a down counter (not shown in FIG. 1), and simultaneously, a flip-flop (not shown in FIG. 1) is set to initiate the activation of the fuel injection valve 11, and thereafter, the flip-flop is reset to stop the fuel injection by a carry-out signal output from the down counter in accordance with the passage of a time equivalent to the time needed for the amount of fuel TAU to be injected.

FIG. 10 shows a relationship between the air-fuel ratio A/F and the torque variation ΔT. In FIG. 10, a solid line shows the relationship between the air-fuel ratio A/F and the torque variation ΔT when the humidity is high, a dash line shows the same relationship when the humidity is low, a solid line with hatching shows an allowable torque variation which is equal to the lean limit, a thin horizontal line shows a control center of the torque variation, and a position P3 indicated by an arrow shows a preset air-fuel ratio at the start of the lean limit control.

When the humidity is low, the position of the air-fuel ratio and the torque variation is at point L, and thus there is a large margin for the lean limit at the start of control, and accordingly, there is little possibility that surging will occur in this condition. Accordingly, the air-fuel ratio is controlled to be between points P4 and P5 indicated by an arrow LC after the lean limit control has been carried out several times to the lean side, as shown at steps 809 to 811 thereby the number of the counter CINIT will exceed the predetermined value $K_2$ during this control. As a result, even if the air-fuel ratio is further controlled and the air-fuel ratio is shifted to the lean side from the range LC and the torque variation becomes large, the air-fuel ratio is returned to the rich side with a small skip amount $K_3$ as explained at steps 806 and 807, and finally, the air-fuel ratio is stabilized in the range LC.

Conversely, when the humidity is high, the position of the air-fuel ratio and the torque variation is at point H, which is near the lean limit or inside the lean limit indicated by hatching, so that the air-fuel ratio is in an overlean state and the torque variation is large at the start of the control. In this case, the number of the counter CINIT does not reach the predetermined value $K_2$, and accordingly, the air-fuel ratio is changed to the rich side with a larger skip amount $K_4$, as explained at steps 806 and 808, and the air-fuel ratio is controlled to be between points P1 and P2 indicated by an arrow HC after the lean limit control is carried out several times to the rich side as shown at steps 806 and 808. Thereafter, if the air-fuel ratio is further controlled and the air-fuel ratio is shifted to the lean side from the range HC after the lean limit control has been carried out several times to the lean side as shown at steps 809 to 811, and the torque variation becomes large, the number of the counter CINIT exceeds the predetermined value $K_2$ during this control. As a result, the air-fuel ratio is returned to rich side with a small skip amount $K_3$, as explained at steps 806 and 807, and finally, the air-fuel ratio is stabilized in the range HC.

In this way, the torque variation is stabilized at the torque variation control center by controlling the air-fuel ratio regardless of a low or high humidity. according to the above described embodiment, and thus the driveability of the vehicle is improved.

FIG. 11A shows the behaviour of the vehicle when the air-fuel ratio is in a lean limit area, and FIG. 11B shows the behavior of the vehicle when the air-fuel ratio is in a stabilized combustion area. As is clear from FIGS. 11A and 11B, even if the air-fuel ratio is in a lean limit area, an actual behavior of the vehicle, i.e. the torque variations or rotational variations in a short period of time such as the ranges (a) or (c), is the same as the behavior of the vehicle when the air-fuel ratio is in a stabilized combustion area. In such a case, if a torque variation control is carried out regardless of the amount of change of the air-fuel ratio to the lean side, the torque variations are controlled in the wrong direction and the driveability of the vehicle is worsened. Conversely, according to the present invention, the skip amount needed to change the air-fuel ratio to the rich side is large ($=K_4$) when the number of changes of the air-fuel ratio to the lean side is less than a predetermined value ($=K_2$) but is small ($=K_3$) when the number of changes of the air-fuel ratio to the lean side is more than the predetermined value. Accordingly, the torque variations are controlled to a stable condition, and the driveability of the vehicle is improved by the present invention.

Note that the vibration period φ and the vibration amplitude A of the vehicle due to variations of the combustion cycle are calculated in accordance with the output signal from the crank-angle sensor 8 or 9 in the above-mentioned embodiment, but the vibration period φ and the vibration amplitude A of the vehicle can be calculated from the output signal of an acceleration detecting sensor mounted on the vehicle.

Further, the engine shown in FIG. 1 has a lean burning system, but if the present invention is applied to an engine having a stoichiometric air-fuel ratio control system, for example, an engine having an EGR system, the amount of EGR can be controlled to stabilize the torque variation due to variations of the combustion cycle. In this case, the following routine shown in FIG. 12 is carried out instead of the routine shown in FIG. 8 and 9.

Figure 12:
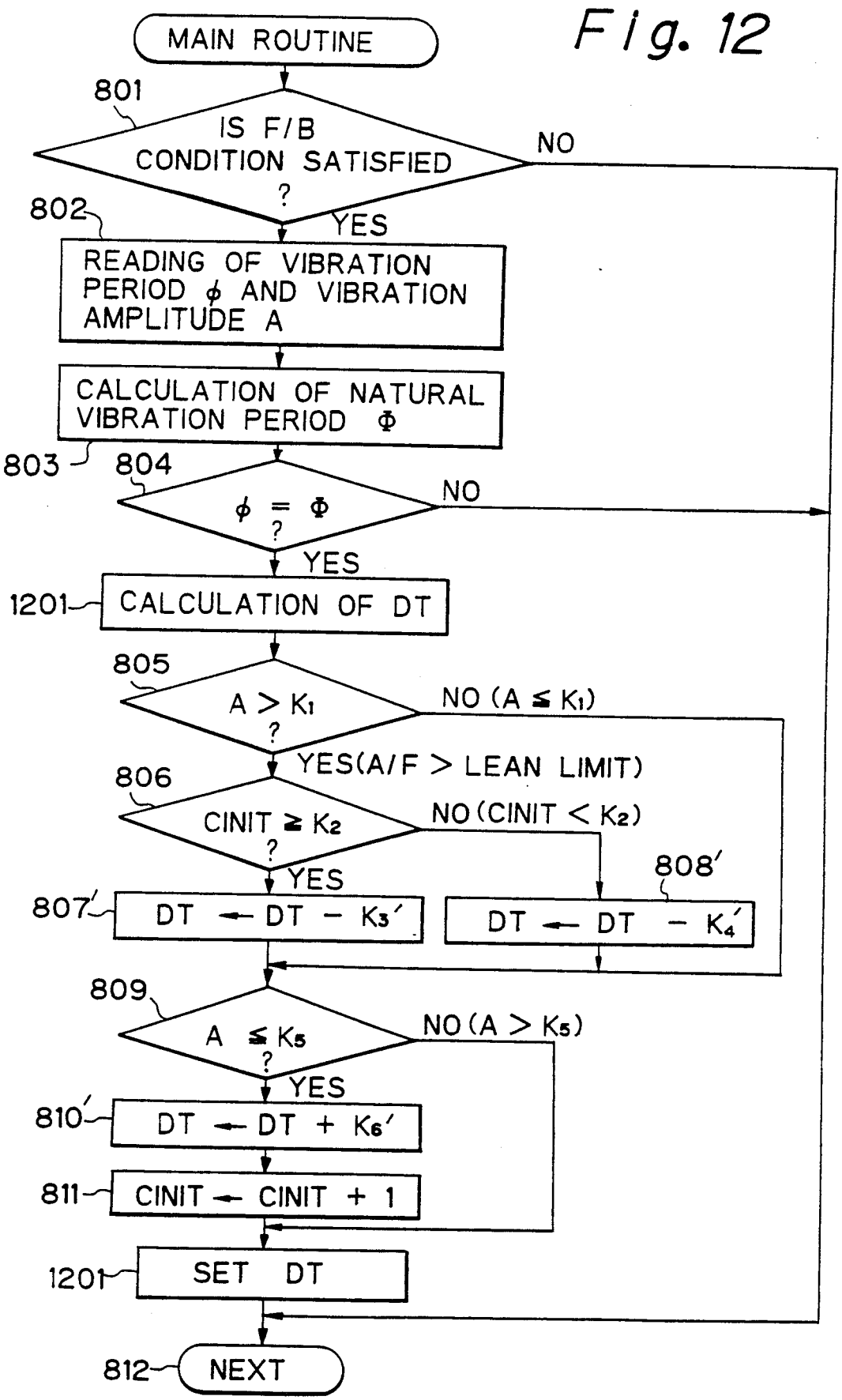
FIG. 12 is a flowchart showing the operation of the control circuit of FIG. 1 when an engine is provided with an EGR system.

FIG. 12 shows the routine for a control of the amount of EGR. In the engine having an EGR system, an increment of the amount of EGR is equivalent to a control of the air-fuel ratio to the lean side, and a decrement of the amount of EGR is equivalent to a control of the air-fuel ratio to the rich side.

Note that the EGR valve 18 is open when the electromagnetic three way valve 20 is energized by the control circuit 10 and the negative pressure of the surge tank 3 is introduced via the electro-magnetic three way valve 20 into the actuator 19, and the amount of EGR is controlled by the duty ratio DT of a signal generated by the control circuit 10. In this case, the amount of EGR is increased when the duty ratio DT is increased, and reduced when the duty ratio DT is reduced.

The control of EGR as shown in FIG. 12 is almost the same as the control of the air-fuel ratio shown in FIG. 8, except that the controls at steps 1201, 807',808', 810', and 1202 are different, and thus the same steps are shown with the same reference number as shown in FIG. 8 and only the different steps are explained below. In FIG. 12, after the control of steps 801 to 804, a duty ratio DT is calculated from a two-dimensional map stored in the ROM 106 using the pressure data PM of the air-pressure sensor 4 and the rotational speed Ne of the engine at step 1201.

If $A \leq K_1$ at step 805 and $A > K_5$, the control proceeds to step 810' because the amount of EGR is small, and the amount of EGR is increased by $$DT \leftarrow DT + K_6'$$

where $K_6'$ is a predetermined definite value. Then at step 811, the counter CINIT for counting a number of increments of the amount of EGR is incremented by 1 and the control proceeds to step 1202 to set the duty ratio DT.

Conversely, at step 806, it is determined whether or not the value of the counter CINIT is larger than or equal to a predetermined value $K_2$, which is a reference value used to determine the degree of increment of the amount of EGR. If $CINIT \geq K_2$ at step 806, the control proceeds to step 807' at which the amount of EGR is reduced by $$DT \leftarrow DT - K_3'$$

where $K_3'$ is a predetermined definite small value, to slightly decrease the amount of EGR. But if $CINIT < K_2$ at step 806, the control proceeds to step 808', at which the amount of EGR is reduced by $$DT \leftarrow DT - K_4'$$

where $K_4'$ is a predetermined definite large value, to largely decrease the amount of EGR.

In this way, the amount of EGR is controlled to become a required value in accordance with the number of increments of the amount of EGR, whereby the torque vibration is controlled to a stabilized value equal to the control of the air-fuel ratio.

Furthermore, although a period of the vibration is used for stabilizing the torque variation due to variations of the combustion cycle, a signal having a frequency, the period of which is the same as the vibration period, can be used.

We claim:

1. A method of controlling a torque variation of an internal combustion engine of a vehicle while said engine is operated, having an air-fuel ratio feedback system, wherein said torque variation due to a combustion variation of the engine is controlled to a predetermined stabilized value, comprising the steps of:

detecting a vibration period and a vibration amplitude of said vehicle;

storing a natural vibration period in accordance with a driving condition of a transmission system of said vehicle;

determining whether or not said detected vibration period is equal to said natural vibration period in accordance with a driving condition under which said vibration period is detected;

determining whether or not said detected vibration amplitude is larger than a predetermined value;

determining that said torque variation is small when said detected vibration amplitude is smaller than or equal to said predetermined value and that said torque variation is large when said detected vibration amplitude is larger than said predetermined value if said detected vibration period is equal to said natural vibration period, in accordance with a driving condition under which said vibration period is detected;

decreasing a coefficient for changing an amount of fuel injection by a predetermined value to shift said air-fuel ratio to the lean side when said torque variation is determined to be small;

counting a number of decrements of said coefficient from the start up of the engine;

increasing a coefficient for changing an amount of fuel injection by a predetermined value in accordance with said number of decrements of said coefficient when said torque variation is determined to be large; and adjusting an amount of fuel injection in accordance with a change of said coefficient and driving condition parameters of said engine.

2. A method as set forth in claim 1, wherein said vibration period of the vehicle and said vibration amplitude are detected in accordance with signals output by a crank-angle sensor.

3. A method of controlling a torque variation of an internal combustion engine of a vehicle having an EGR system wherein said torque variation due to a combustion variation of the engine is controlled to a predetermined stabilized value even when torque variation characteristic opposing an air-fuel ratio has changed due to a change of circumstances after said engine is stopped, characterized in that said method comprises the steps of:

detecting a vibration period and a vibration amplitude of said vehicle;

storing a natural vibration period in accordance with a driving condition of a transmission system of said vehicle;

determining whether or not said detected vibration period is equal to said natural vibration period in accordance with a driving condition under which said vibration period is detected;

determining whether or not said detected vibration amplitude is larger than a predetermined value;

determining that said torque variation is small when said detected vibration amplitude is smaller than or equal to said predetermined value and said torque variation is large when said detected vibration amplitude is larger than said predetermined value if said detected vibration period is equal to said natural vibration period, in accordance with a driving condition under which said vibration period is detected;

increasing an amount of EGR by a predetermined value when said torque variation is determined to be small;

counting a number of increments of said amount of EGR from the start up of the engine;

decreasing an amount of EGR by a predetermined value in accordance with said number of increments of said amount of EGR when said torque variation is determined to be large; and adjusting an amount of fuel injection in accordance with a change of said amount of EGR and driving condition parameters of said engine.

4. A method as set forth in claim 3, wherein said vibration period of the vehicle and said vibration amplitude are detected in accordance with signals output by a crank-angle sensor.

5. An apparatus for controlling a torque variation of an internal combustion engine of a vehicle while said engine is operated, having an air-fuel ratio feedback system, wherein said torque variation due to a combustion variation of the engine is controlled to a predetermined stabilized value, comprising:

means for detecting a vibration period and a vibration amplitude of said vehicle;

means for storing a natural vibration period in accordance with a driving condition of a transmission system of said vehicle;

means for determining whether or not said detected vibration period is equal to said natural vibration period in accordance with a driving condition under which said vibration period is detected;

means for determining whether or not said detected vibration amplitude is larger than a predetermined value;

means for determining that said torque variation is small when said detected vibration amplitude is smaller than or equal to said predetermined value and said torque variation is large when said detected vibration amplitude is larger than said predetermined value, if said detected vibration period is equal to said natural vibration period, in accordance with a driving condition under which said vibration period is detected;

means for decreasing a coefficient for changing an amount of fuel injection by a predetermined value to shift said air-fuel ratio to the lean side when said torque variation is determined to be small;

means for counting a number of decrements of said coefficient from the start of the engine;

means for increasing a coefficient for changing an amount of fuel injection by a predetermined value in accordance with said number of decrements of said coefficient when said torque variation is determined to be large; and means for adjusting an amount of fuel injection in accordance with a change of said coefficient and driving condition parameters of said engine.

6. An apparatus as set forth in claim 5, wherein said vibration period of the vehicle and said vibration amplitude are detected in accordance with signals output by a crank-angle sensor.

7. An apparatus for controlling a torque variation of an internal combustion engine of a vehicle having an EGR system, wherein said torque variation due to a combustion variation of the engine is controlled to a predetermined stabilized value even when a torque variation characteristic opposing an air-fuel ratio has changed due to a change of circumstances after said engine is stopped, characterized in that said apparatus comprises:

means for detecting a vibration period and a vibration amplitude of said vehicle;

means for storing a natural vibration period in accordance with a driving condition of a transmission system of said vehicle;

means for determining whether or not said detected vibration period is equal to said natural vibration period in accordance with a driving condition under which said vibration period is detected;

means for determining whether or not said detected vibration amplitude is larger than a predetermined value;

means for determining that said torque variation is small when said detected vibration amplitude is smaller than or equal to said predetermined value and said torque variation is large when said detected vibration amplitude is larger than said predetermined value, if said detected vibration period is equal to said natural vibration period, in accordance with a driving condition under which said vibration period is detected;

means for increasing an amount of EGR by a predetermined value when said torque variation is determined to be small;

means for counting a number of increments of said amount of EGR from the start of the engine;

means for decreasing an amount of EGR by a predetermined value in accordance with said number of increments of said amount of EGR when said torque variation is determined to be large; and means for adjusting an amount of fuel injection in accordance with a change of said amount of EGR and driving condition parameters of said engine.

8. An apparatus as set forth in claim 7, wherein said vibration period of the vehicle and said vibration amplitude are detected in accordance with signals output by a crank-angle sensor.

9. An apparatus for controlling a torque generated by an internal combustion engine by varying a control amount of the engine relative to combustion conditions of the engine, comprising:

means for detecting a parameter representing an amplitude of vibration of said engine;

means for determining whether or not said detected parameter is larger than a predetermined value;

first means for varying a control amount of the engine by a first predetermined amount so that said torque is increased when said detected parameter is larger than said predetermined value;

second means for varying a control amount of the engine by a second predetermined amount so that said torque is decreased when said detected parameter is not larger than said predetermined value;

means for determining whether or not variation of said control amount by said second means has occurred a number of times greater than a fixed number of times since a start of said engine; and means for reducing said first predetermined amount so that said torque is increased more gradually by said first means, after said second means has varied said control amount of the engine by said second predetermined amount since said start of said engine.

10. An apparatus as set forth in claim 9, wherein said control amount of the engine is a fuel amount injected to the engine.

11. An apparatus as set forth in claim 9, wherein said parameter representing an amplitude of vibration of said engine is a difference between a time which said engine takes to rotate through a predetermined crankshaft angle and successive time which said engine takes to rotate through said predetermined crankshaft angle.

12. An apparatus as set forth in claim 10, wherein said control amount of the engine is a fuel amount injected to the engine.

* * * * *